Sept. 27, 1927.   1,643,829
C. BIRO
MEAT CUTTER
Filed July 8, 1924   5 Sheets-Sheet 1

Inventor
Carl Biro
By L. G. Bruce
Attorney

Sept. 27, 1927.
C. BIRO
MEAT CUTTER
Filed July 8, 1924
1,643,829
5 Sheets-Sheet 2
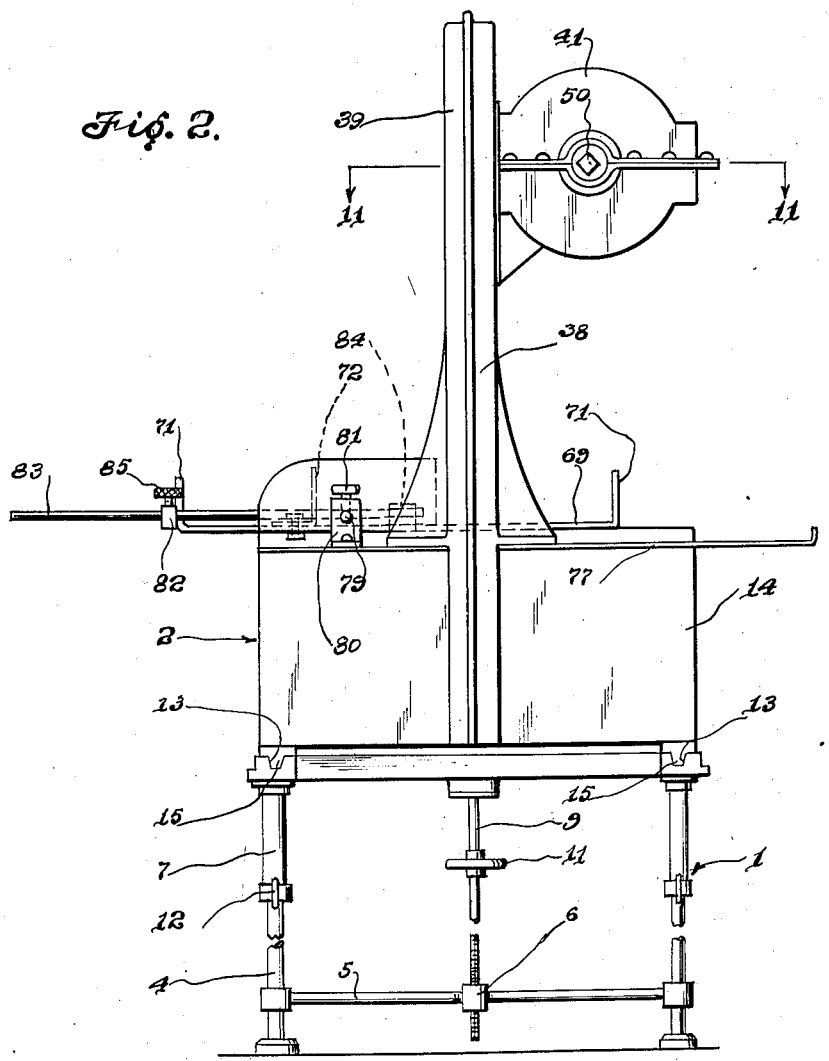
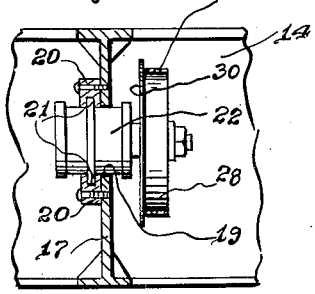
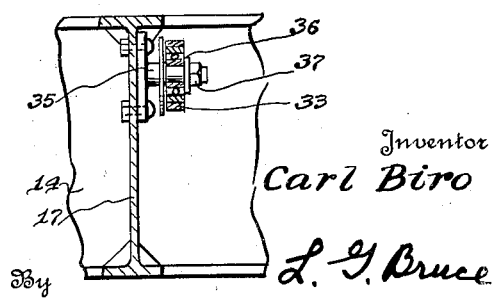
Inventor
Carl Biro
By L. G. Bruce
Attorney Sept. 27, 1927.

C. BIRO 1,643,829

MEAT CUTTER

Filed July 8, 1924   5 Sheets-Sheet 3

Inventor
Carl Biro
By L. J. Bruce
Attorney

Sept. 27, 1927. 1,643,829
C. BIRO
MEAT CUTTER
Filed July 8, 1924 5 Sheets-Sheet 4
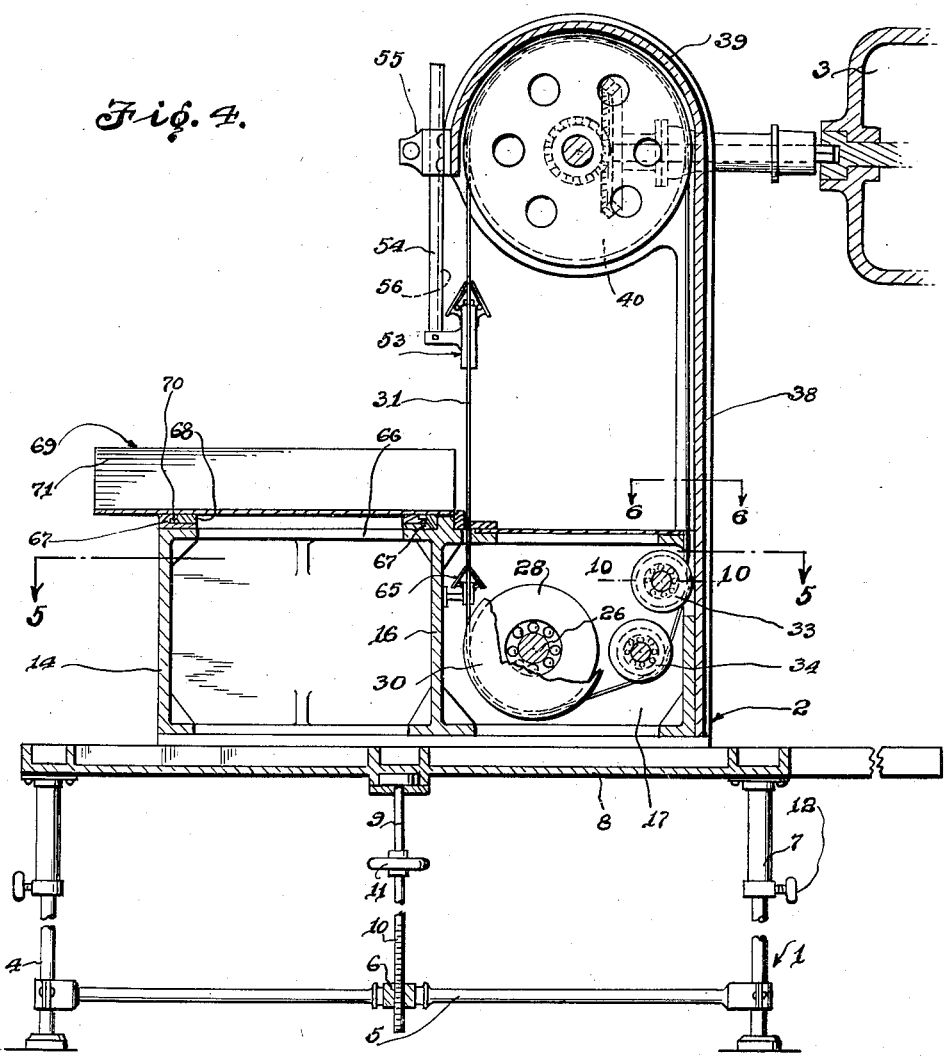
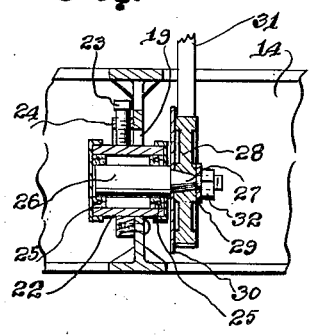
Inventor
Carl Biro
By L. G. Bruce
Attorney Sept. 27, 1927.
C. BIRO
MEAT CUTTER
Filed July 8, 1924
1,643,829
5 Sheets-Sheet 5
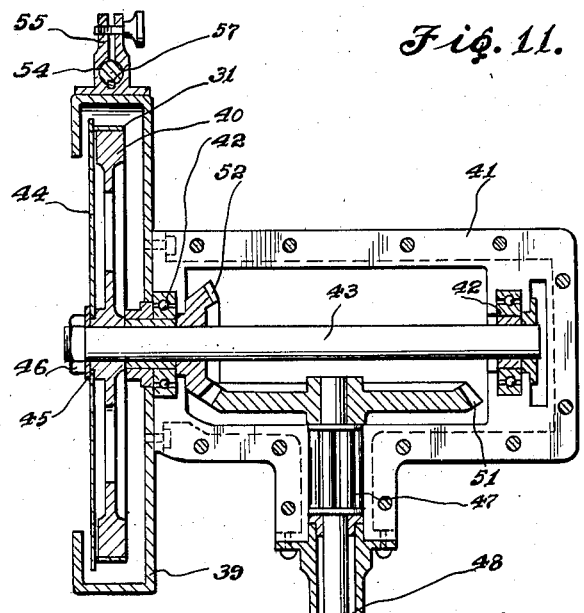
Fig. 11.
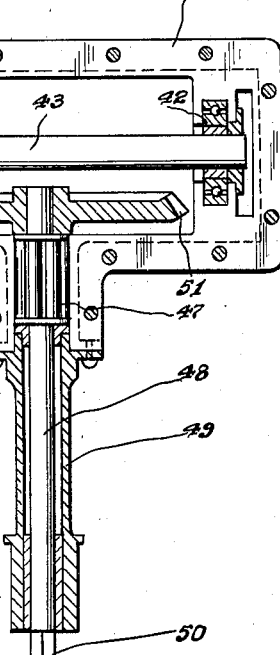
Fig. 12.
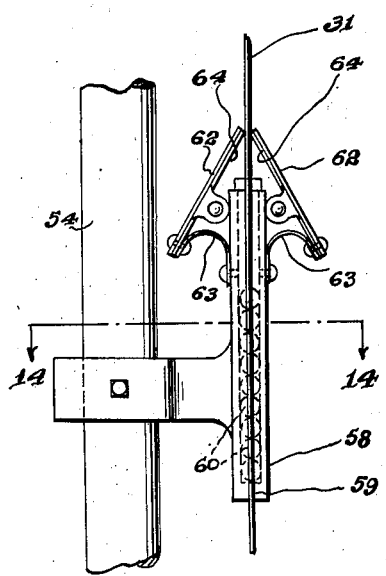
Fig. 13.
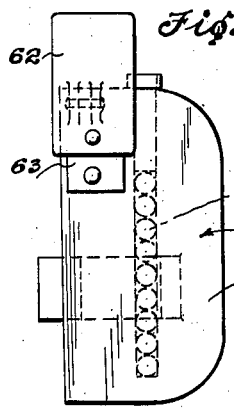
Fig. 14.
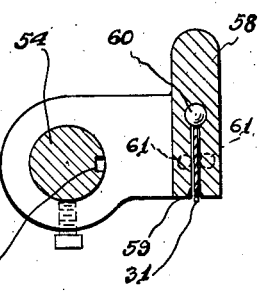
Inventor
Carl Biro
By L. G. Bruce
Attorney Patented Sept. 27, 1927.

1,643,829

UNITED STATES PATENT OFFICE.

CARL BIRO, OF MARBLEHEAD, OHIO.

MEAT CUTTER.

Application filed July 8, 1924. Serial No. 724,848.

This invention relates to improvements in saws and more particularly to a sawing machine for cutting bones and the like.

In most meat markets, motor driven meat grinders are used for grinding sausages and hamburg and the motors that drive such grinders are constructed to permit the attachment of meat stuffers, meat choppers and coffee mills. The power of such motors ranges from one quarter to one horse power. The present machine is an attachment to any of these motors.

The motor driven meat saws now used in markets weigh from 600 to 1000 lbs.; they are about five feet in height; and they are rather high in price. One of the objects of the present invention is to provide a meat saw which will weigh about 100 lbs.; can be driven by a smaller motor than the saws now in use; will be about 25 inches in height and may be manufactured for about one-fifth of the cost of the well known meat saw.

Other objects of the invention will be pointed out in the following detail description, which should be read in connection with the accompanying drawings.

Referring to the drawings:—

Fig. 2 is an end view of the same.

Fig. 4 is a longitudinal vertical sectional view taken on line 4—4 of Fig. 3.

Fig. 7 is a vertical sectional view of a detail taken on line 7—7 of Fig. 5.
Fig. 8 is a similar view taken on line 8—8 of Fig. 7.

Fig. 9 is a horizontal sectional view taken on line 9—9 of Fig. 7.

Fig. 10 is a detail sectional view taken on line 10—10 of Fig. 4.

Fig. 11 is an enlarged horizontal sectional view of a detail taken on line 11—11 of Fig. 1.

Fig. 12 is a front view enlarged, of an improved saw guide, forming part of the machine.

Fig. 13 is a side view of the latter.

Fig. 14 is a horizontal sectional view of the guide taken on line 14—14 of Fig. 12.

Figure 1:
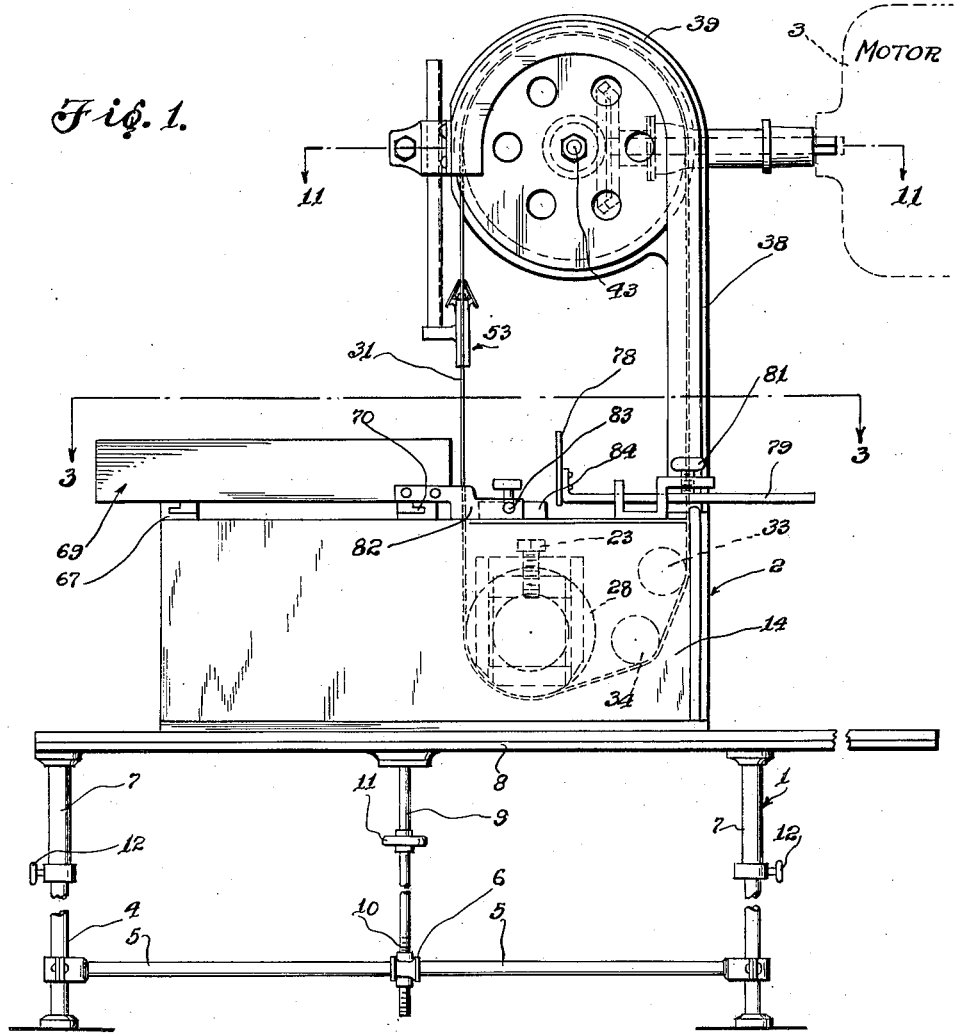
Fig. 1 is a side view of the improved saw.
Figure 6:
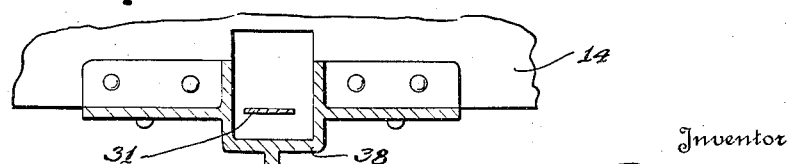
Fig. 6 is a detail sectional view taken on line 6—6 of Fig. 4.

In the drawings, 1 designates a vertically adjustable supporting stand on which the sawing machine 2 rests. This stand permits the machine to be raised or lowered for attachment to a fixed motor 3, which is employed in most meat markets to drive various machines. These motors usually drive a detachable hamburg cutter and they are supported and fixed at various heights. With the present machine the hamburg cutter may be detached from the motor whenever desired and then the improved meat saw may be coupled with this motor to permit the motor to drive the meat saw. Therefore the stand 1 is adjustable vertically and the machine 2 may slide horizontally on this stand.

The stand 1 preferably consists of four legs 4 connected together by horizontal braces 5 which carry a fixed nut 6 at the point where they intersect. Vertically slidable on the legs 4, are sleeves 7 which have their upper ends connected to a top 8. This top and the sleeves 7 may be raised or lowered by a rod 9 which has its upper end swiveled in the top 8 and its lower end 10 threaded into the nut 6. A hand wheel 11 is fixed to the rod to permit the operator to actuate the latter. A thumb screw 12 is attached to each sleeve for locking the sleeves in adjusted positions. The top 8 is provided with suitable horizontal guides or tracks preferably provided with horizontal grooves 13.

The sawing machine frame 14 has runners 15 at its bottom which are slidable in the grooves 13, and from Fig. 1 it may be seen that after the stand 1 is properly located and adjusted to the necessary height, the machine 2 may be moved back and forth to bring the driving shaft of the saw into engagement with the driven shaft of the motor 3. When a purchaser secures one of the present sawing machines, he will adjust the stand 1 to the proper height and then whenever he desires, he may detach the hamburg cutter or the like, from the motor 3 and may then move the machine 2 toward the right so as to couple the same with the motor.

Figure 5:
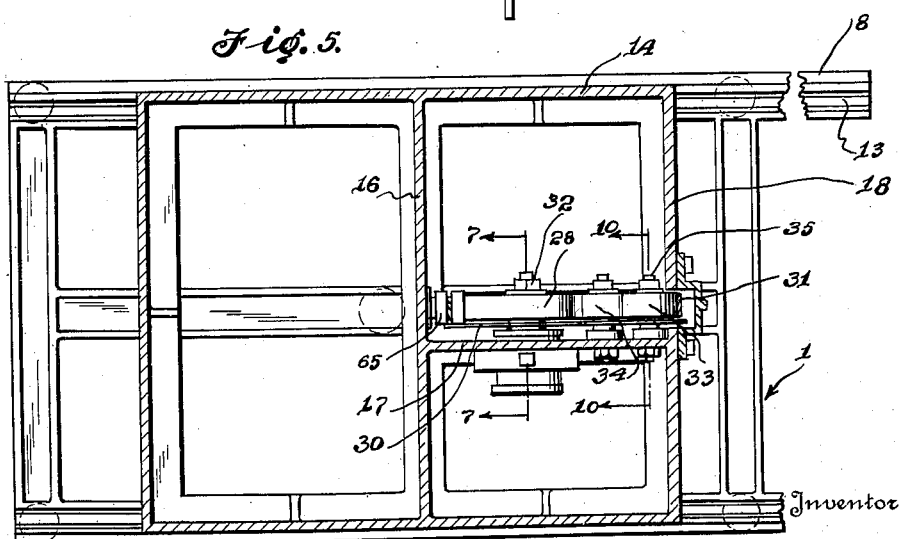
Fig. 5 is a horizontal sectional view taken on line 5—5 of Fig. 4.

The frame 14 has an internal cross web 16, as best shown in Fig. 5, and a longitudinal web or partition 17 extends from the web 16 to the end 18 of the frame. The web 17 is provided with a vertically disposed slot 19 and fixed to the side of the web adjacent said slot, are grooved guides 20, in which slide the ribs 21 of a bearing box 22. This box may be adjusted vertically by any suitable means, such as a screw 23 which is threaded in a fixed bearing or nut 24 on the web 17. Arranged within the box 22, are ball bearings 25 which support a rotatable shaft 26 having a conical projecting stud 27 carrying a lower guide pulley 28, which bears against a washer 29. Abutting against the pulley 28, is a fiber disk 30 of larger diameter than the pulley and adapted to engage the back edge of the band saw 31, for preventing the latter from moving off of the pulley in one direction. The disk and washer are held in position by a nut 32 threaded on the end of the shaft 26.

Two idler pulleys 33 and 34, are associated with the pulley 28, and a detail of one of these is shown in Fig. 10. Each of these idler pulleys is mounted on a stud 35 projecting from the web 17. A ball bearing 36 is arranged between the stud and pulley, and a nut 37 is employed to hold the pulley and ball bearing in position. The saw 31 also passes about the idler pulleys 33 and 34.

A supporting guard 38 extends upwardly from one end of the machine frame and terminates in a semi-circular hood 39 having an open lower end to permit the main or upper drive pulley to be inserted from beneath. The saw blade 31 also passes around the upper pulley, and at this time attention is called to the fact that the present machine may cut meat of any thickness that may be cut by the machines now in use, but the machine 2 is of much less height than the well known machines. This is partially accomplished by arranging the relatively small pulleys 33, 34 and 28 in the frame 14 instead of employing a lower pulley of the same diameter as the pulley 40. If we assume that the pulley 40 is nine inches in diameter, it may be seen that the frame 14 would have to be made of sufficient height to house a pulley of this size, but by employing smaller pulleys below, I can make the frame 14 of considerably less height and weight than the frames of the ordinary machines.

The guard hood 39 is detachably connected to a sectional gearing box 41, each section of which forms a partial bearing for the ball bearings 42. These bearings support a shaft 43 on which the pulley 40 is fixed. A fiber disk 44 is also carried by this shaft and is arranged alongside of the pulley 40 to prevent the band saw 31 from pulling off of the pulley. A washer 45 and a nut 46 are employed to hold the pulley and disk on the shaft 43. The sections of the box 41 also form half bearings for a roller bearing 47 which supports a driving shaft 48 that extends longitudinally through a sleeve 49 carried by the box 41. This shaft has a square end 50 which may be moved into the ordinary socket at the end of the shaft of the motor 3, so that the shaft 48 may be driven by the motor. A large gear 51, preferably having about 43 teeth is fixed on the inner end of the shaft 48 and arranged within the box 41, and this gear meshes with a smaller gear 52 preferably having about 14 teeth, arranged within the box 41 and fixed on the shaft 43. From this it may be seen that the motor may drive the saw through 48, 51, 52 and 40.

A suitable guide 53 for the saw blade is carried by a depending rod 54, which has its upper end adjustably mounted in a split clamp 55 fixed on the hood 39. The rod is preferably provided with a keyway 56 to engage a key 57 in the clamp 55, this key preventing the rod from turning but permitting vertical adjustment of the rod. The vertical adjustment of the rod permits the guide 53 to be raised sufficiently to clear the meat.

The guide is best shown in Figs. 12 to 14 inclusive, and it preferably consists of a piece of brass 58 having a longitudinal groove 59 to guide the saw blade. Rollers 60 are arranged in the piece 58 to engage the back edge of the saw blade and rollers 61 are provided to engage the sides of the blade. This anti-friction guide will prevent the blade from breaking.

Arranged at the upper end of the piece 58, are pivotally mounted gates 62, the upper ends of which are forced toward one another by springs 63. These gates are lined with suitable material 64, such as felt or leather to wipe the grease from the blade 31.

A similar guide 65 is stationarily mounted within the frame below the table 66 of the frame, and these two guides function to align the saw blade at the place where it cuts through the beef or bone, and they also wipe the grease from the blade.

The left hand portion of the table 66 is provided with under cut grooved tracks 67 which receive runners 68 fixed on the bottom of the sliding meat supporting pan 69. Each runner has a projecting flange 70 which extends into the undercut portion of the groove in the track, and therefore prevents the pan 69 from tipping. This is a desirable feature, as in the machines heretofore used, the pan has tipped due to the weight of the meat and has caused serious accidents and breaking of the machine.

The pan is preferably of channel shape, and has its ends turned up to form end walls 71, and the meat is adapted to be forced against one of these end walls by a movable jaw 72, which is preferably formed of a piece of angle iron and has a screw or the like 73 at its center to move in a slot 74 for adjustment purposes. Heretofore the bottom of the meat pan has been provided with pegs or grooves to prevent the meat from slipping along the upper surface of the pan, but such a formation prevents the ready cleaning of the pan. The upper surface of my pan is smooth and consequently it may be quickly washed.

The pan 69 is provided at its inner longitudinal edge with a fiber strip 75 which just clears the band saw 31, and if the blade should be deflected for any reason, this fiber strip will abut against the saw blade and prevent the teeth from being damaged. This strip acts as a guard means, for otherwise the teeth of the blade might contact with the inner edge of the metal pan and be damaged beyond repair.

Figure 3:
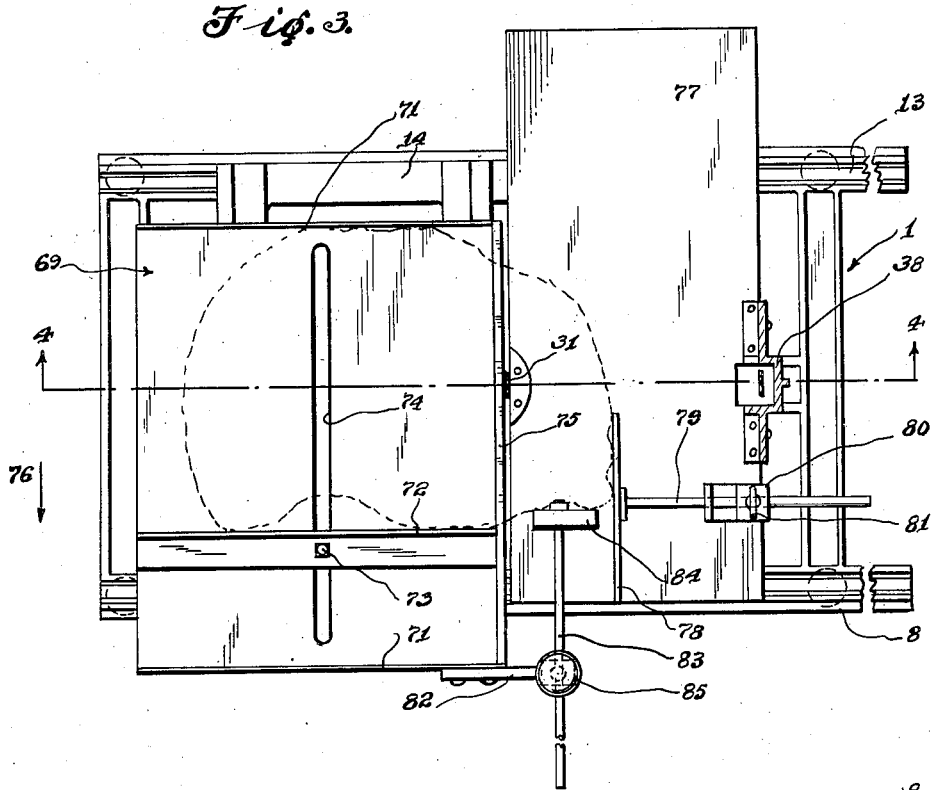
Fig. 3 is a horizontal sectional view taken on line 3—3 of Fig. 1.

Referring to Fig. 3, it may be seen that the piece of meat to be cut is placed on the pan 69 and is clamped between the jaw 72 and one end wall 71 of the pan, and then the pan is moved by hand in the direction of the arrow 76, so that the blade 31 functions to saw off a piece of the meat, which is deposited on the stationary table 77. The width of the piece to be cut may be gaged by a gaging plate 78 which projects over the stationary table 77 and is provided with a rod 79 slidable in a bearing bracket 80. The rod is fixed in any position by a thumb screw 81.

To prevent the cut piece of meat from interfering with the return of the pan or with the saw blade, the pan is provided at one end with a projecting arm 82 which supports a bar 83 carrying a pusher 84. The bar may be fixed in various positions by a thumb screw 85 and it may be seen from Fig. 3 that when the pan 69 is moved in a direction opposite to the arrow 76, the pusher 84 will move with the pan and move the cut piece of meat along the stationary table 77 and out of the way.

Reverting now to some of the advantages of the invention, it is to be noted that the adjustable pulley 28 and idler pulleys 33 and 34 permits the height and weight of the machine to be reduced and still allows the same cutting capacity in the height and thickness of the meat.

The purpose of the bevel gears 51 and 52 is to allow the meat cutting attachment to be set just ahead and parallel to the axis of the motor shaft and this conserves space and permits the attachment to be quickly and conveniently coupled to the motor shaft.

The improved saw guide 53 may slide vertically but cannot turn. In guides which may work loose and turn, the saw may cut uneven or crooked and cause damage to the machine.

The surface of the table or pan 69 is absolutely smooth, which makes it easier to clean than the meat cutting machines now in use, that have pegs and corrugated pans for holding the meat from turning while it is being sawed or cut. The sliding detachable jaw 72 which holds the meat firmly, eliminates the possibility of the operator being injured, and the pusher 84 carries the meat away from the saw as it is cut off and thus does away with the necessity of the operator reaching around the saw as the meat is cut. This also prevents the meat from piling up against the saw.

The fiber disks alongside the saw guide pulleys prevent the blade from coming off, should the operator, in pulling the pan 69 back to make a second cut, strike the saw with the meat.

From the foregoing, it is believed that the construction, operation and advantages of the invention may be readily understood, and it is apparent that details of the construction may be changed without departing from the spirit of the invention as expressed in the claims.

What I claim and desire to secure by Letters Patent is:

1. In a meat cutting machine, means for supporting a slidable saw supporting frame, comprising a supporting stand including legs, sleeves vertically slidable on said legs, braces connecting the legs and carrying a stationary nut, a top secured on said sleeves, a rod connected to said top and threaded into said nut, and tracks supported by the top.

2. In a support for meat sawing machines having a slidable saw carrying frame, leg members, sleeve members slidably engaging the leg members, braces connecting certain of said members and provided with a fixed nut, a top carried by the remainder of said members and provided with a rotatable rod having threads engaging said nut, means for locking the leg members to the sleeve members, and tracks carried by said top.

In testimony whereof I hereunto affix my signature.

CARL BIRO.